(12) United States Patent
Hellberg

(10) Patent No.: US 7,227,902 B2
(45) Date of Patent: Jun. 5, 2007

(54) METHOD AND APPARATUS FOR DIGITAL CHANNELISATION AND DE-CHANNELISATION

(75) Inventor: Richard Hellberg, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1488 days.

(21) Appl. No.: 09/731,775

(22) Filed: Dec. 8, 2000

(65) Prior Publication Data

US 2001/0030940 A1    Oct. 18, 2001

Related U.S. Application Data

(63) Continuation of application No. PCT/SE99/00971, filed on Jun. 4, 1999.

(30) Foreign Application Priority Data

Jun. 10, 1998 (SE) .................................. 9802059

(51) Int. Cl.
*H04L 27/00* (2006.01)

(52) U.S. Cl. ................. 375/259; 375/260; 375/349; 375/350; 708/300; 708/321; 708/403; 708/404; 708/405; 708/420; 370/210

(58) Field of Classification Search ................ 375/259, 375/260, 349, 350; 708/300, 321, 403, 404, 708/405, 420; 370/210
See application file for complete search history.

(56) References Cited

U.S. PATENT DOCUMENTS 4,141,072 A * 2/1979 Perreault .................... 702/124
4,537,076 A * 8/1985 Lax et al. ..................... 73/662
5,297,070 A * 3/1994 Hua et al. ................... 708/404
5,365,470 A * 11/1994 Smith ......................... 708/406
5,606,575 A * 2/1997 Williams .................... 375/219
5,671,168 A * 9/1997 Liu et al. .................... 708/321
5,886,749 A * 3/1999 Williams et al. ............ 348/614

FOREIGN PATENT DOCUMENTS

EP           0501690      9/1992
WO         WO95/28045   10/1995

OTHER PUBLICATIONS

"A Flexible On-board Demultiplexer/Demodulator", Proceedings of the 12th AIAA International Communication Satellite Systems Conference, 1988, pp. 299-303.

* cited by examiner

*Primary Examiner*—David C. Payne
*Assistant Examiner*—Erin M. File

(57) ABSTRACT

The present invention relates generally to the problem of filtering, decimation or interpolation and frequency conversion in the digital domain, and more particularly to its use in wideband multichannel receiver, channelization, and transmitter, de-channelization, structures. The invention combines a stand-alone fast convolution algorithm which is further modified and then combined with additional signal processing. By intelligently splitting the filtering effort between the modified fast convolution algorithm block and an additional signal processing block a synergy is created between the two blocks which provides for decreased costs, reduced delay and a reduction in the size of the Fast Fourier Transforms (FFTs). The resulting advantages are especially useful in any system handling multiple channels simultaneously, but especially where there exist strict requirements on both delay and on input Fast Fourier Transform (FFT) size.

17 Claims, 10 Drawing Sheets

Receiver Channeliser Implemented Via
A Decimated Filter Bank

η% Overlap Block Generator

η% Overlap Block Combiner

METHOD AND APPARATUS FOR DIGITAL CHANNELISATION AND DE-CHANNELISATION

This application is a continuation of International Application No. PCT/SE99/00971 filed on 4 Jun. 1999, which designates the United States, and which International Application was published by the International Bureau in English on 16 Dec. 1999.

FIELD OF THE INVENTION

The present invention relates generally to the problem of filtering, decimation or interpolation and frequency conversion in the digital domain, and more particularly to its use in wideband multichannel receiver, channelisation, and transmitter, de-channelisation, structures.

RELATED ART

In radio base station applications for cellular, Land Mobile Radio (LMR), satellite, wireless local area networks (WLAN's) and other communication systems, many receiving and transmitting channels are handled simultaneously. In the future this will also become the situation for the terminals, i.e. mobile telephones. There exist channelisation and de-channelisation structures in the receiver and transmitter, respectively, in these radio systems. Channelisation and de-channelisation can be defined as the filtering, decimation/interpolation and the frequency conversion of the signals transmitted and received.

The traditional receiver architecture as seen in FIG. 1 can be explained in terms of the Radio Frequency (RF) signal being received by the antenna and then downconverted to an intermediate frequency (IF) by an RF front end. The RF front end consists of components such as Low Noise Amplifiers (LNA's), filters and mixers. The desired channel is then extracted by the receiver channeliser. The channeliser also consists of LNA's, mixers and filters.

The desired channel is then processed at baseband by the RX baseband processing unit to produce the received digital data stream. Today the baseband processing usually consists of Analog to Digital Converters (ADCs), digital filtering, decimation, equalisation, demodulation, channel decoding, de-interleaving, data decoding, timing extraction etc.

The traditional transmitter architecture in FIG. 1 is the dual of the receiver architecture. The transmitted data is first processed by the TX baseband processing unit which consists of data coding, interleaving, channel coding, modulation, interpolation filtering, Digital to Analog Converters (DACs) etc. The baseband channel is then converted to an IF frequency via the transmit de-channeliser. The transmit de-channeliser consists of filters, mixers and low power amplifiers. The IF signal is then converted to RF and amplified by the RF front end which consists of mixers, filters, and a high power amplifier.

FIG. 1 illustrates the traditional architecture for a single channel receiver and transmitter, which is accurate for the terminal (i.e. mobile phone) application. In the case of a basestation, multiple channels are processed in a similar way. On the receiver side the path will split at some point to form multiple paths for each channel being processed. On the transmitter side the channels will be processed individually and then they will be combined at some point to form a multichannel signal. The point of the split and combination varies, and therefore a variety of basestation receiver and transmitter architectures can be created. More importantly, though, the traditional analog and digital interface is currently somewhere between the channeliser and baseband processing blocks.

The analog channeliser/dechanneliser is complex to design and manufacture, and therefore costly. Therefore, in order to produce a cheaper and more easily produced channeliser/dechanneliser, the future analog and digital interface will lie, instead, somewhere between the RF front end and channeliser blocks. Future radio receiver and transmitter structures of this type are called a variety of names, including multistandard radio, wideband digital tuners, or wideband radio and software radio, and they all require a digital channeliser/de-channeliser.

Efficient digital channeliser/de-channeliser structures, consisting of filtering, decimation/interpolation and frequency conversion, are very important in terms of power consumption and die area on a per channel basis. With one of the main goals being to integrate as many channels into a single Integrated Circuit (IC) as possible there are several known ways to achieve digital channelisation/de-channelisation.

The most obvious way is shown in FIG. 2. This receiver architecture mimics the functions of a traditional analog channeliser with In-phase and Quadrature(IQ) frequency conversion using e.g. sin/cos generators, decimating and filtering on a per-channel basis. The bulk of the decimation filtering can be done with computationally cheap CIC filters. Integrated circuits containing this architecture are readily available from several manufacturers. The dual of this architecture is also possible for the transmitter.

The IQ channeliser is flexible in that it can handle many standards simultaneously and that the channels can be placed arbitrarily. Its main drawback is the need for an IQ frequency conversion at a high input sampling frequency and subsequent decimation filters for each channel. This means that the die area and power consumption is relatively high per channel.

Another channeliser possibility is to build a decimated filter bank in the receiver, as shown in FIG. 3. This method shares a common polyphase filter between many, or all, channels. The hardware cost for this structure is small since it is split between many channels, and good filtering can be achieved.

Filter banks are also good for use in transmitter de-channelisers since they both interpolate and add the channels together. An example of this is illustrated in WO 9528045 "Wideband FFT Channeliser". Many satellite transponders are also built upon this principle. Although these filter banks can be reconfigured to fit different standards, it is still difficult to accommodate multiple channel spacings at the same time.

The decimated filter bank has a very low cost per channel, but only if all or the majority of channels are used. This architecture is also very inflexible since the channels have to lie on a fixed frequency grid and only one channel spacing is possible. Multiple standards make the filter bank concept require multiple sampling rates, which means multiple architectures, including the ADC and channeliser, are required for simultaneous multiple standards.

A variation on the structure of the decimated filter bank, called a subsampled filter bank, can lower the computational cost at the expense of flexibility. For example, requirements for adaptive channel allocation, irregular channel arrangements and frequency hopping precludes using subsampled filter banks, since all channels must be available at the same time.

The third main channelisation technique is based on the fast convolution scheme of the overlap-add (OLA) or overlap-save (OLS) type. This should be distinguished from the "overlap-add" and "overlap-save" terminology as used in WO 9528045. That patent describes filter banks derived from the short-time Fourier transform, called overlap-add filter banks, which are not the same as fast convolution. The filter banks and fast convolution are two different methods, both using FFTs. The overlap-add filter bank, however, does not use both FFTs and IFFTs, but only one FFT or one IFFT. Fast convolution is a means of using cyclic convolution to exactly perform linear convolution, i.e. Finite Impulse Response (FIR) filtering. The advantage of this technique is the lower computational requirement as compared to implementing the traditional form of linear convolution. However, it is possible to modify the basic fast convolution algorithm such that it is possible to simultaneously decimate/interpolate and frequency convert, at the expense of then only approximately performing linear convolution. The modifications also reduce the computational complexity. The stand-alone modified fast convolution algorithm, as illustrated in "A Flexible On-board Demultiplexer/Demodulator", Proceedings of the 12th AIAA International Communication Satellite Systems Conference, 1988, pp. 299–303, is claimed to be a very computationally efficient technique for systems containing a mixture of carrier bandwidths, although the technique discussed here is limited to satellite systems.

The stand-alone modified fast convolution algorithm in the prior art performs all the filtering alone, without any additional signal processing. The "Flexible On-board Demultiplexer/Demodulator" in the previous paragraph, for example, does all the filtering in the frequency domain, without splitting the filtering efforts. This method leads to various delays. However, delays are an inherent part of satellite systems, due to the time to transmit to and from the satellite. Thus, delays due to the filtering method affects the system proportionately less than if the stand-alone modified fast convolution algorithm were to be used in a radio, e.g. cellular, system. In most radio systems the delay becomes a much more crucial factor which should be reduced as much as possible.

The stand-alone modified fast convolution algorithm, applied to the receiver channeliser, chops the incoming data signal into blocks whose size depends on the percentage of overlap (% overlap) and the length of the Discrete Fourier Transform (DFT). The DFT is subsequently performed. The truncated filter response, that is the number of filter coefficients ($N_{coefficients}$) is less than the length of the DFT ($N_{DFT}$), is implemented directly in the frequency domain. This is done by multiplying the filter coefficients with the selected output bins of the DFT. The result is then processed by an Inverse Discrete Fourier transform (IDFT) of equal length to the truncated filter as a means to recover the time domain samples of the desired channel. The blocks are then overlapped, depending on the % overlap, and combined. The combination is either a process of adding the overlapped section, overlap and add, or discarding the overlapped section, overlap and save. Note that overlap/add and overlap/save can be considered two extremes, and there are techniques known in the art that lie in-between these two.

The truncation of the frequency response in the stand-alone modified fast convolution algorithm distinguishes it from the standard fast convolution approach. It causes the circular convolution algorithm to now only approximate linear convolution, although with carefully chosen coefficients the error can be kept small. Truncation of the frequency response also performs decimation by a factor of ($N_{coefficients}/N_{DFT}$), and the frequency conversion is completed by centering the truncated filter coefficients on the wanted channel.

The truncated frequency response also causes a dramatic reduction in the computational complexity in the channel specific parts of the algorithm, that is everything but the DFT. The number of multiplications needed to implement the frequency filter and the size of the IDFT are reduced by approximately a factor of ($N_{coefficients}/N_{DFT}$). The stand-alone modified fast convolution algorithm can also be applied to the transmitter de-channeliser, containing all the same attributes.

Other reductions in complexity that can be applied to standard fast convolution, can also be applied here to the stand-alone modified fast convolution algorithm. For example the DFT is a critical block in the operation. For efficiency reasons it is usually implemented in the form of a Fast Fourier Transform (FFT). Additionally, two real data blocks can be processed at the same time in one complex DFT processor. Some extra adders and memory are then needed for post-processing. This is more efficient than using two dedicated real DFTs.

Computational savings can also be made in the DFTs through the use of pruning, since only a part of the DFT outputs need to be calculated. Pruning refers to the process of cutting away branches in the DFT that do not affect the output. The output points that are not needed are never computed.

A computational reduction can also be achieved if the complex multiplication of the filter frequency response is replaced by real multiplication and a subsequent circular shift of the IDFT output block of data before it is combined to form the time domain samples of the desired channel. The amount of circular shift depends only on the % overlap and the length of the IDFT.

There is still a problem with the above systems, especially in future systems involving the reception and transmission of many channels simultaneously. As seen above, the choice of a digital channeliser, employed from a few channels up to a large number of channels, is very dependant upon the target radio communication system or systems. Invariably a trade-off between computational cost and flexibility based on the radio systems requirements will make the ultimate decision of which wideband channeliser algorithm to choose. There is still room to improve these channeliser/dechanneliser structures in terms of computational cost and flexibility so that they may be better suited for use in systems with many channels.

SUMMARY OF THE INVENTION

The present invention relates generally to the problem of filtering, decimation or interpolation and frequency conversion in the digital domain, and more particularly to the problems discussed above. The means of solving these problems according to the present invention are summarised in the following.

As can be seen above, there still exists a problem with current methods of digital channelisation/de-channelisation, especially in terms of systems which handle many channels simultaneously (e.g. cellular, Land Mobile Radio, satellite, wireless local area networks (WLANs)). All of the methods discussed above (IQ frequency conversion, filterbanks, fast convolution, stand-alone modified fast convolution) each have their own drawbacks as regards their computational cost and/or flexibility.

Accordingly, it is an object of the present invention to provide a method to increase the flexibility and decrease the cost in filtering, decimation/interpolation and frequency conversion structures. The invention can be described as combining a further modified fast convolution algorithm with additional signal processing. This modification to the original modified fast convolution algorithm then makes it a very suitable channeliser/dechanneliser structure, in terms of computational cost and flexibility, for radio communication systems, employing more than a few channels.

FIG. 4 illustrates the invention's architecture 400. There is shown the channeliser architecture 410, as might be used in a receiver, where following the modified fast convolution algorithm 420 is a signal processing block 430. This signal processing block 430 could consist of numerically controlled oscillators ("NCOs"), time or frequency domain resampling, matched channel filtering, CIC or halfband filters, fast convolution algorithms (standard or stand-alone modified) etc.

FIG. 4 also shows the de-channeliser architecture 415, as might be used in a transmitter, where preceding the modified fast convolution algorithm 425 is a signal processing block 435. This signal processing block 435 could consist of NCOs, time or frequency domain resampling, matched channel filtering, CIC or halfband filters, fast convolution algorithms (standard or stand-alone modified) etc.

As pointed out above, the prior art stand-alone modified fast convolution algorithm has problems with delays. These are not such a large problem in the satellite systems for which it was designed but would be a big problem if used in other radio systems such as cellular systems. The present invention reduces the order of the per-channel filter response. This results in a reduction in the size of the multichannel FFT (or IFFT) which reduces the delay due to the multichannel FFT (or IFFT). In addition, the complexity of the computations is reduced. Thus, the present invention solves the problems of delay and computational complexity in the prior art.

However, this reduction in the order of the per-channel filter will make it insufficient to isolate particular channels during frequency conversion and decimation. Additional filtering necessary to isolate the channel can be done post-FFT (or pre-IFFT). Therefore, significant advantages can be obtained by making the order of the filter response insufficient to isolate particular channels and then performing the necessary filtering post-FFT (pre-IFFT).

The inventive aspect of the present invention can be thus described as intelligently splitting the filtering effort between both the modified fast convolution algorithm and the additional signal processing block. This splitting is distinctive and very important to achieve a low computational cost and a high amount of flexibility compared to the other channelisation/de-channelisation algorithms. The synergy created between the modified fast convolution algorithm and the additional signal processing provides for decreased costs, reduced delay and a reduction in the size of the FFTs.

The present invention is not discussed in terms of any particular system. It is particularly applicable to many radio base station applications in e.g. cellular, Land Mobile Network (LMR), satellite, wireless local area networks (WLAN's). However, it is not limited to these systems and may, in general, be used in any system handling multiple channels simultaneously where there exist strict requirements on both delay and on input FFT size. In addition, it's use is not restricted to use in basestations, but may also be used in e.g. future mobile terminals that are also capable of handling multiple channels simultaneously.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

Figure 1:
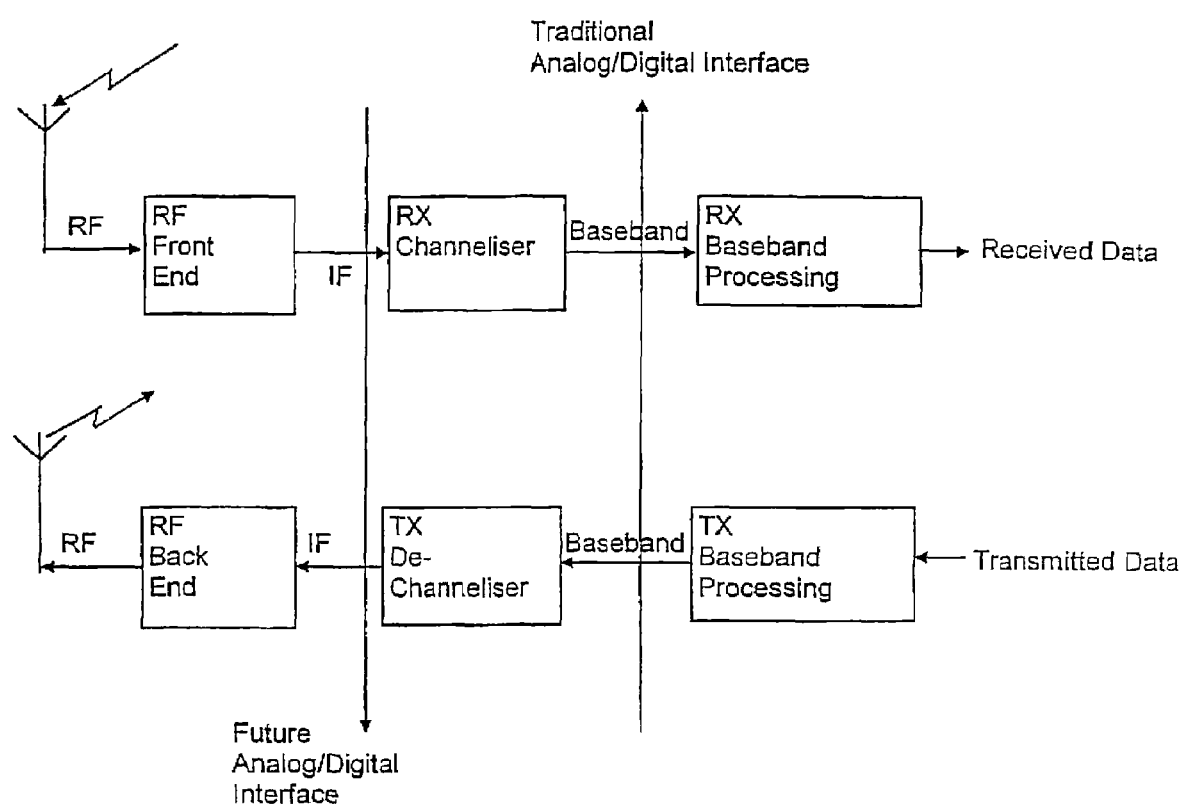
FIG. 1 is a diagram of a traditional radio transmitter and receiver architecture.
Figure 2:
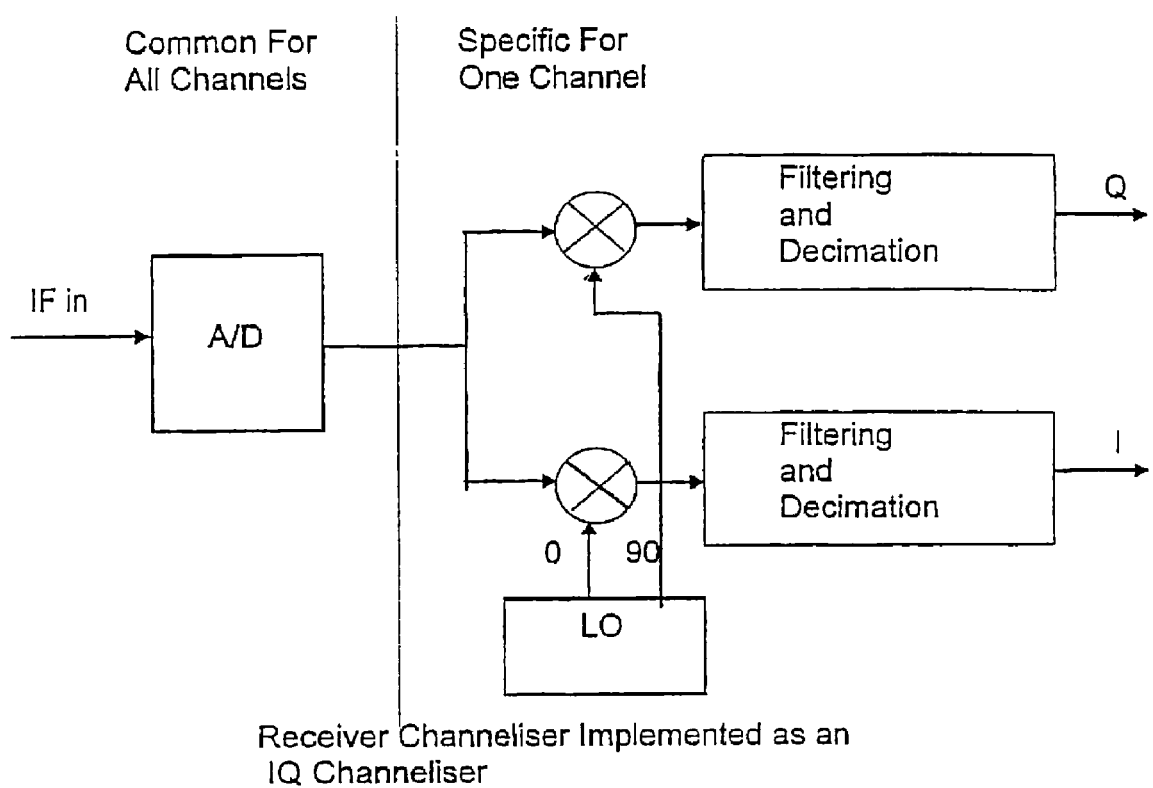
FIG. 2 is a diagram of a state of the art IQ-demodulating digital receiver.
Figure 3:
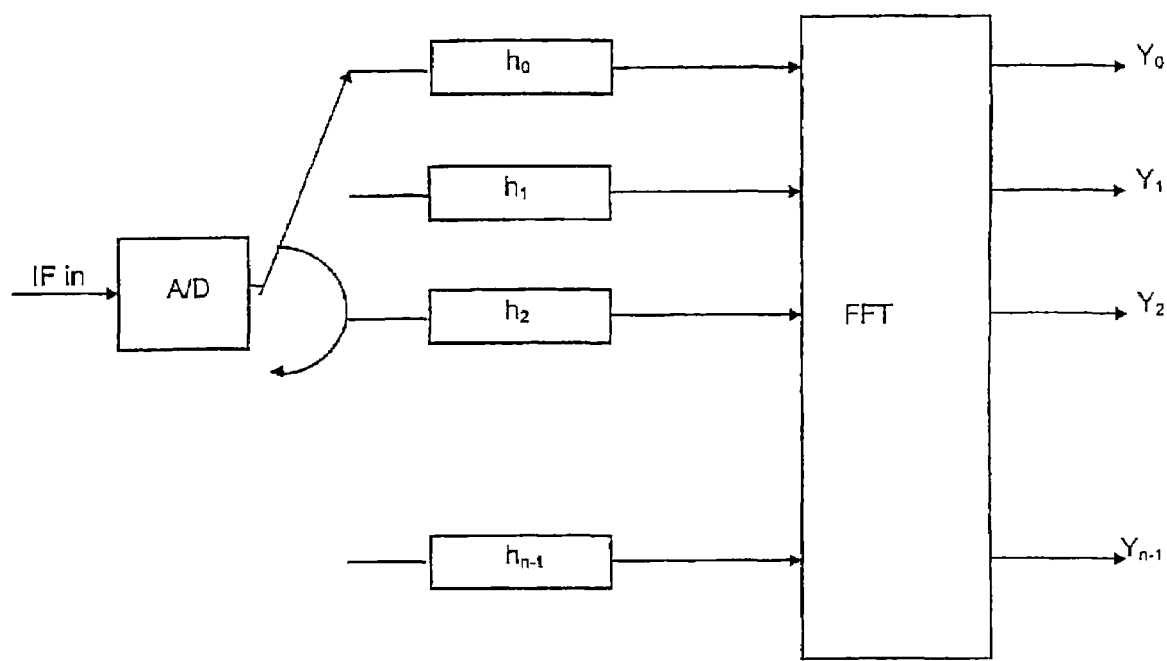
FIG. 3 is a diagram of a state of the art decimated filter bank.
Figure 4:
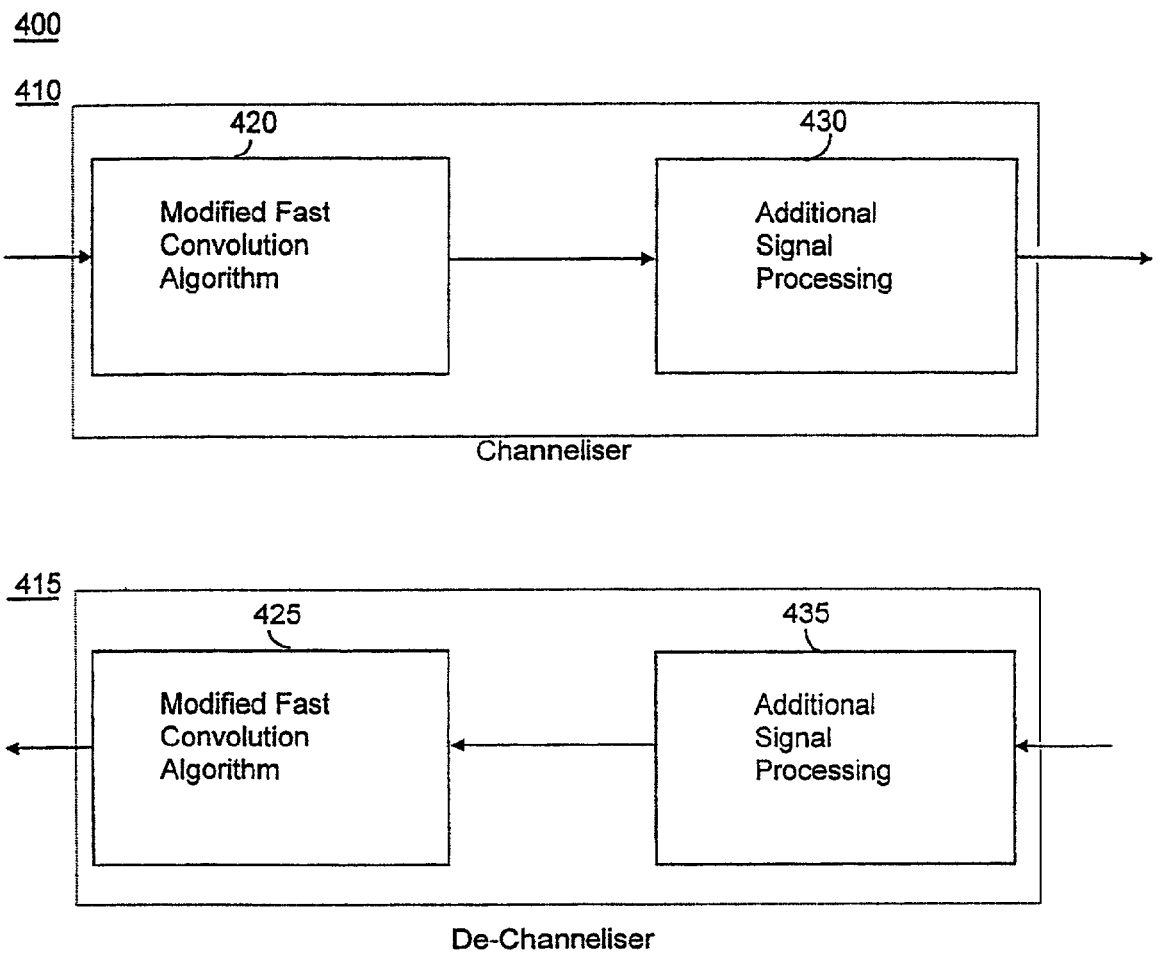
FIG. 4 is an overview diagram of the channeliser and dechanneliser in the present invention.

FIG. 4 provides an overview of the present invention's architecture. The invention consists of two stages. The first stage consists of the modified fast convolution algorithm 420, 425, which carries out filtering, resampling and down-conversion. There is a modified fast convolution algorithm 420 in the channeliser architecture 410 as used in e.g. a receiver. There is also a modified fast convolution algorithm 425 in the de-channeliser architecture 415 as used in e.g. a transmitter.

The second stage of the invention is a signal processing block 430, 435, which could consist of NCOS, time or frequency domain resampling, filters (matched channel, CIC or halfband), fast convolution algorithms (standard or stand-alone modified), and complex filters etc. There is a signal processing block 430 in the channeliser architecture 410 as used in e.g. a receiver. There is also a signal processing block 435 in the de-channeliser architecture 415 as used in e.g. a transmitter.

The components of the second stage 430, 435, are considered well known to those knowledgeable in the digital signal processing techniques. The first stage 420, 425, is based on the stand-alone fast convolution algorithm of the prior art, but which is then further modified in the present invention as discussed below. This results in a reduced FFT size and reduced delay, as further discussed below.

Figure 5:
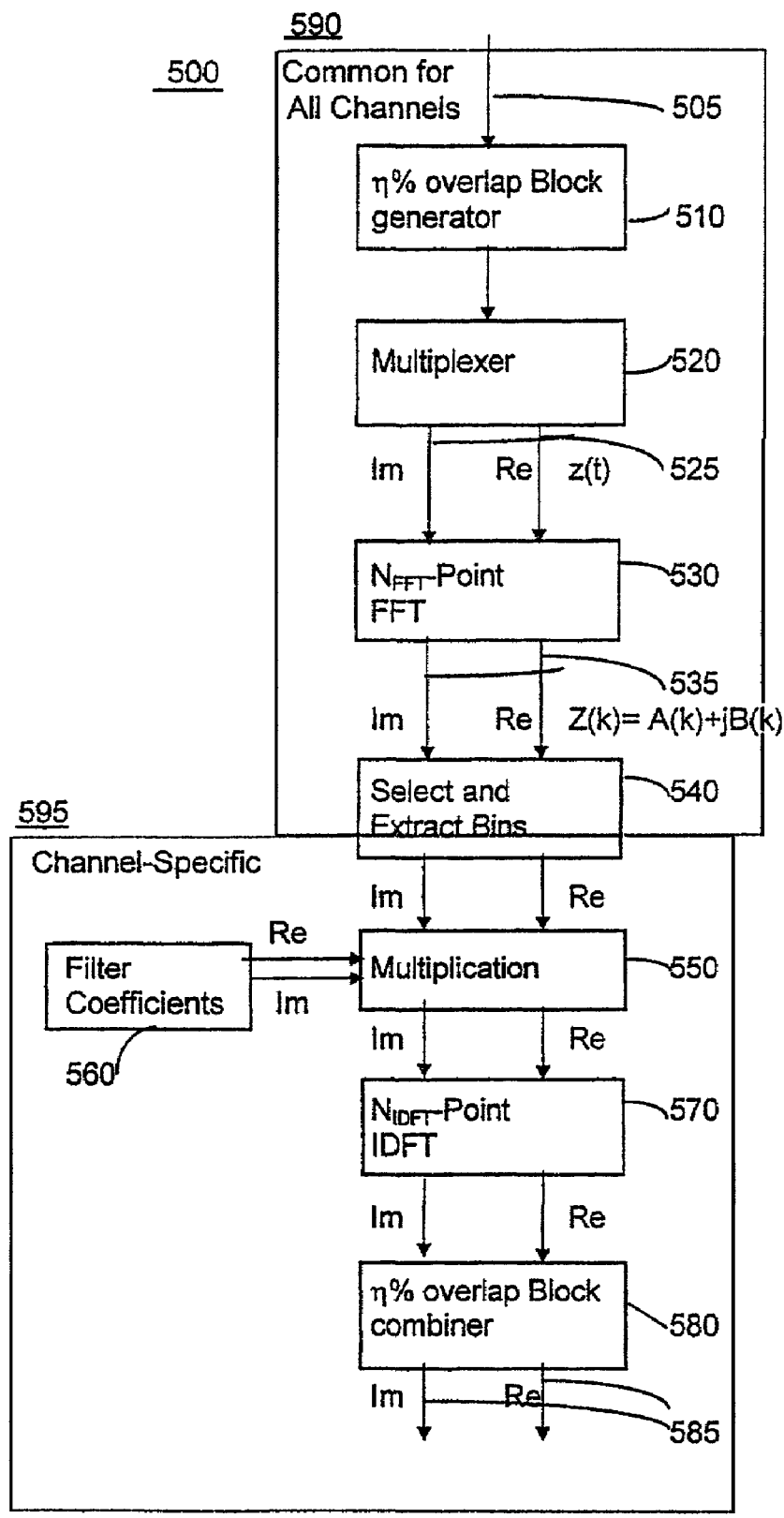
FIG. 5 is a diagram of the first stage of the invention applied to the receiver in general.

In FIG. 5 is shown a diagram of a general embodiment of the first stage, the modified fast convolution algorithm, of the invention, which is further modified according to the present invention and applied to a receiver. The input signal 505 is a stream of data coming from a prior process, typically an ADC, and the DFT part of the algorithm is in the preferred embodiment implemented in the form of a FFT.

The data stream 505 is first processed by the $\eta$ % overlap Block generator 510. This process is based on the amount of percentage overlap, the size of the FFT and the type of overlap, that is overlap/add or overlap/save as discussed below. In the case of overlap/add, the data stream is chopped into non-overlapping sections of length $N_{FFT}*(1-\eta)$, and padded with $N_{FFT}*\eta$ zeros to form a single block. In the situation of overlap and save the data is chopped into blocks of length $N_{FFT}$, which have an overlap with the previous block given by a length of $N_{FFT}*\eta$.

The blocks consist of real data only, and can then be multiplexed 520 in a number of different ways to form a complex signal 525 for input into the FFT algorithm, e.g. $z(t)=x(t)+j*y(t)$, where $x(t)$ and $y(t)$ are the two consecutive blocks. The second sequence $y(t)$ may also be rotated to save on memory. Although this stage is not necessary, it makes efficient use of the FFT algorithm; it consists of buffer memory and some control logic.

The FFT algorithm is then completed 530. The FFT architecture here can take many forms; for example, an efficient implementation for this type of high speed calculation uses the pipeline architecture with a power of 2, hence FFT. The output 535 of the FFT will then not be in the correct order. Therefore, the bin select and extract block 540 must compensate for this by reordering the output sequence and only selecting the bins needed. The number of bins needed depends on the number of filter coefficients 560. As well as selecting the bins and extracting the two actual results, $X(k)$ and $Y(k)$, from the FFT output, where $Z(k)=A(k)+j*B(k)$.

The extraction algorithm will depend on the multiplexing technique employed prior to the FFT. For example, with 50% overlap and add, the second sequence, $y(n)$ has been rotated $N_{FFT}/2$ points to save on memory. Therefore, to extract the correct $X(k)$ and $Y(k)$ the following equations require implementation:

$$X(k) = \frac{A(k)+A(N-k)}{2} + j\frac{B(k)-B(N-k)}{2}$$

$$Y(k) = \left(\frac{B(k)+B(N-k)}{2} + j\frac{A(k)-A(N-k)}{2}\right) \times (-1)^k$$

Whereas for 25% overlap, the second sequence, $y(n)$, has been rotated $N_{FFT}/4$ points to save on memory. Therefore to extract the correct $X(k)$ and $Y(k)$ the following equations require implementation:

$$X(k) = \frac{A(k)+A(N-k)}{2} + j\frac{B(k)-B(N-k)}{2}$$

$$Y(k) = \left(\frac{B(k)+B(N-k)}{2} + j\frac{A(k)-A(N-k)}{2}\right) \times (j)^k$$

The X and Y blocks are now ordered in the same order as they were when multiplexed. The blocks are then multiplied 550 with the filter frequency coefficients 560. The number of coefficients 560 is less than the length of the FFT. An Inverse Discrete Fourier Transform (inverse-DFT or IDFT) 570 is then completed on the result of the previous multiplication. Because it is not a critical operation, the size of the IDFT, $N_{IDFT}$, does not have to be a power of 2.

The blocks are then inserted into the $\eta$ % overlap block combiner 580. The blocks are combined 580 depending on their % overlap and whether it is overlap/save or overlap/add which is being employed, as discussed below. For either overlap and add or overlap and save, the blocks are overlapped with the previous block by a length equal to $N_{IDFT}*\eta$. For overlap and add, the overlapping part of the block is added to the previous blocks corresponding overlapping part, while for overlap and save the overlapping part of the block is simply discarded. For both overlap and add and overlap and save there are no operations performed on the non-overlapped part of the block.

In FIG. 5 it can also be seen that certain sections of the present method are common for all channels 590. One common data stream 505, common for all channels arrives at the first step. Then the $\eta$ % overlap block generator 510, the multiplex step 520, and the FFT 530 are performed on all channels. Then the bins will be extracted 540 from these channels and the following steps will be channel specific 595, performed individually on each channel. Thus the multiplication 550, IDFT 570, and the $\eta$ % overlap block combiner 580 steps will each be performed separately on each channel.

Figure 6:
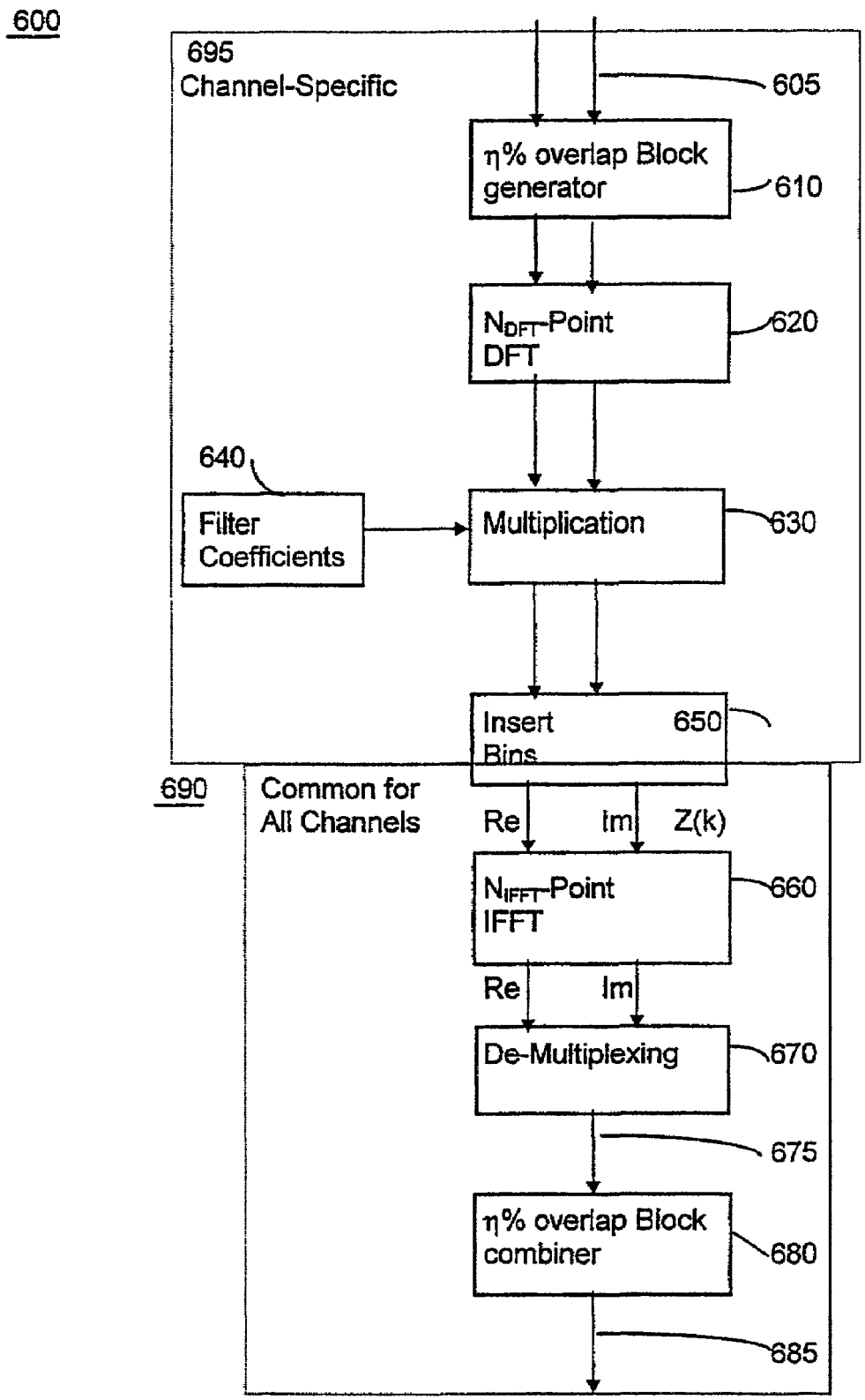
FIG. 6 is a diagram of the first stage of the invention applied to the transmitter in general.

FIG. 6 is a diagram of a general embodiment of the first stage, the modified fast convolution algorithm, of the invention as modified according to the present invention and applied to the transmitter. The input signal is a stream of data 605 coming from a prior process, typically an ADC, and the DFT part of the algorithm is not necessarily implemented in the form of a FFT (power of 2), as in the case of the receiver. In contrast to FIG. 5, the input data stream here is specific to one channel, rather than a stream combining many channels.

The data stream 605 is first processed by the $\eta$ % overlap Block generator 610. This process is largely based on the amount of percentage overlap, the size of the DFT and the type of overlap, that is overlap/add or overlap/save as discussed below. In the case of overlap/add, the data stream is chopped into non-overlapping sections of length $N_{FFT}*(1-\eta)$, and padded with $N_{FFT}*\eta$ zeros to form a single block. In the situation of overlap and save the data is chopped into blocks of length $N_{FFT}$, which have an overlap with the previous block given by a length of $N_{FFT}*\eta$.

A Discrete Fourier Transform (DFT) 620 is then completed on the result of the previous operation. Because it is not a critical operation, the size of the DFT, $N_{DFT}$, does not have to be a power of 2. However, the DFT 620 here can also be implemented as an FFT. As contrasted with the receiver in FIG. 5, the DFT 620 structure is small and the IFFT 660 structure is large, the opposite of the receiver.

The block is then multiplied 630 with the filter frequency coefficients 640. The frequency filter coefficients 640 are equivalent to the FFT of the frequency response.

The next step is the Insert Bin block 650. The bins are inserted into the Inverse Fast Fourier Transform 660 in the following symmetrical way: $Z(k_{start}+k)=X(k)$ and $Z(N_{IFFT}-k_{start}-k)=X'(k)$. Here the bins to be inserted for one channel are given by $X(0) \to X(N-1)$. These come from the multiplier 630 and are complex. $X'(k)$ is the complex conjugate of $X(k)$. The IFFT in which they are inserted into has $N_{IFFT}$ possible complex bins, numbered from $Z(0) \to Z(N_{IFFT}-1)$. $K_{start}$ is where the first bin of the channel is to be inserted, and k is an integer from $0 \to N-1$.

The result of inserting the block in a symmetrical way will be that only the real output from the IFFT will contain the desired result. There is no useful information in the imaginary output. Since the only useful output lies in the real output from the IFFT, the overlap block combiner 680 will only have to perform very simple operations. This is important since the overlap combiner 680 is operating at the highest sampling frequency and could otherwise have a significant effect on power and size.

An alternative method of inserting bins 650 is to multiplex two blocks of data from the same channel together so that the first block X(k) comes out the real output and the second block Y(k) comes out the imaginary output of the IFFT. The following equations show how this is done: $Z(k_{start}+k)=X(k)+jY(k)$ and $Z(N_{IFFT}-k_{start}-k)=X'(k)+jY'(k)$.

The bins from all channels are then inserted into the IFFT 660 where the IFFT algorithm is then completed. The blocks are then de-multiplexed 670 to form a real signal 675 for input into the η % overlap block generator 680.

The blocks are combined 680 depending on their % overlap and whether it is overlap/save or overlap/add which is being employed, as discussed below. For either overlap and add or overlap and save, the blocks are overlapped with the previous block by a length equal to $N_{IDFT}*\eta$. For overlap and add, the overlapping part of the block is added to the previous blocks corresponding overlapping part, while for overlap and save the overlapping part of the block is simply discarded. For both overlap and add and overlap and save there are no operations performed on the non-overlapped sections.

In FIG. 6 it can also be seen that certain sections of the present method are common for all channels 690 and certain sections are channel specific 695. One data stream 605, specific to one channel arrives at the first step. Then the η % overlap block generator 610, the FFT 620, and the multiplication 630 are performed on this channel. Next, the bins will be inserted 650 for this channel and the following steps will be common to all channels 690. Thus the IFFT 660, demultiplexing 670, and the η % overlap block combiner 680 steps will each be performed on all channels.

Figure 7:
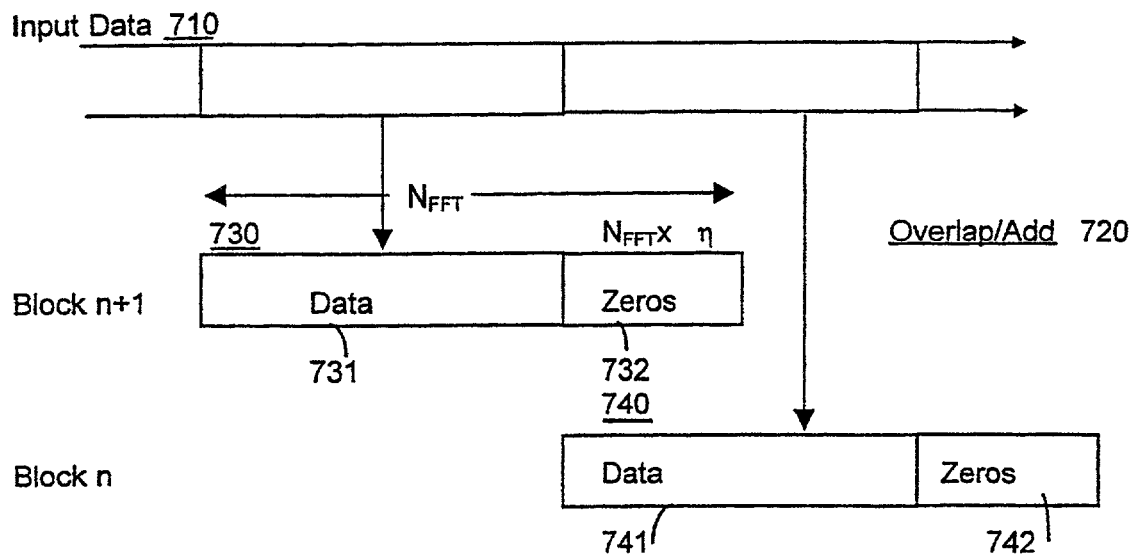
FIG. 7 is a diagram of the $\eta$ % overlap block generator
Figure 7:
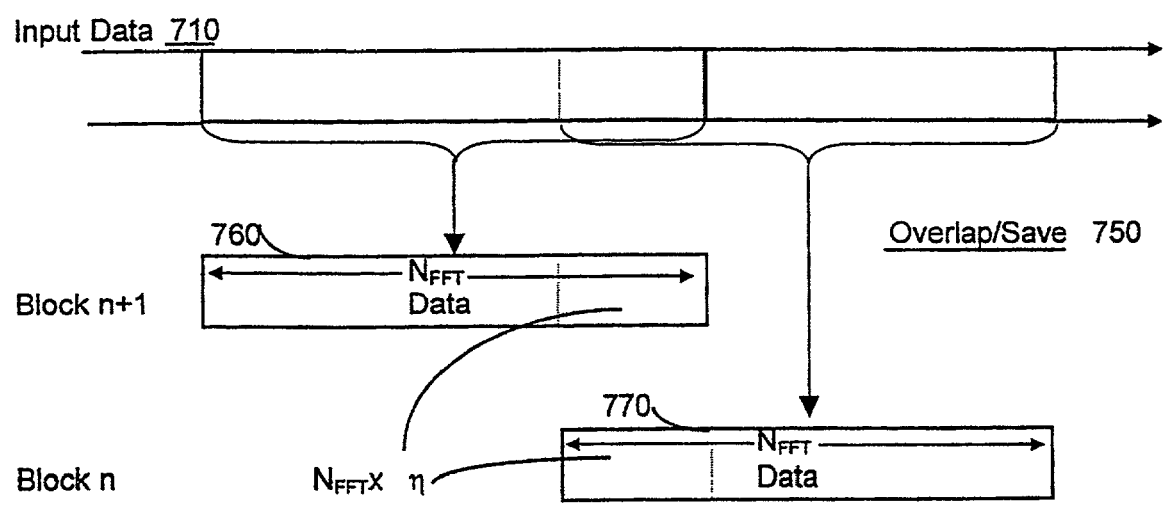

In FIG. 7 is shown a diagram of the data stream as processed by the η % overlap block generator, 510 FIG. 5, 610 FIG. 6. This process is based on the amount of percentage overlap, the size of the FFT and the type of overlap, that is overlap/add or overlap/save as discussed below. In the case of overlap/add 720, the data stream 710 is chopped into non-overlapping sections 731, 741, of length $N_{FFT}*(1-\eta)$, and padded with $N_{FFT}*\eta$ zeros 732, 742, to form consecutive blocks 730, 740. In the situation of overlap and save 750 the data stream 710 is chopped into blocks 760, 770, of length $N_{FFT}$, which have an overlap 780 with the previous block given by a length of $N_{FFT}*\eta$.

Figure 8:
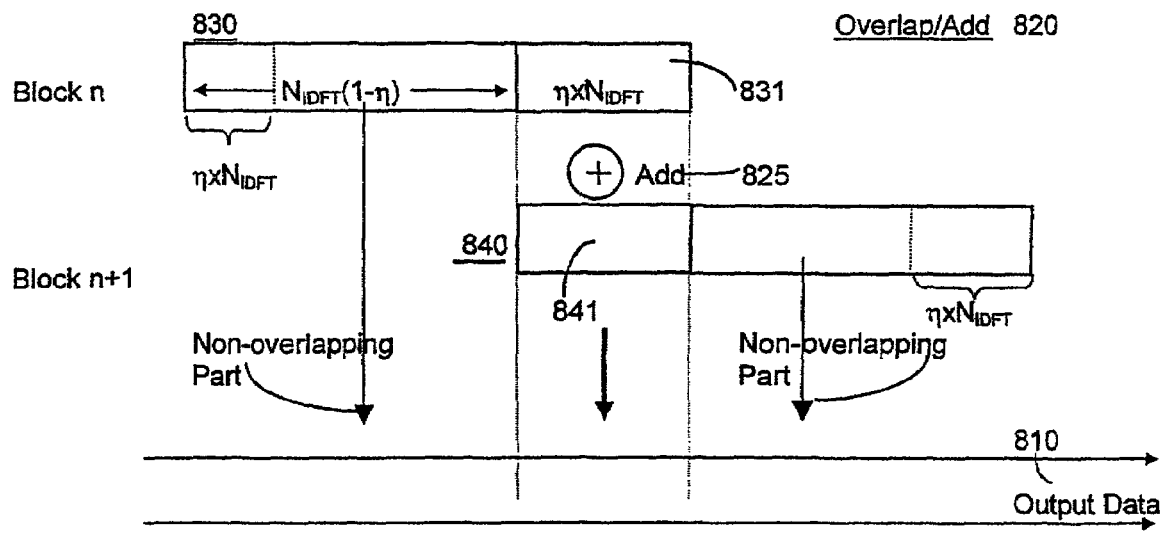
FIG. 8 is a diagram of the $\eta$ % overlap block combiner.
Figure 8:
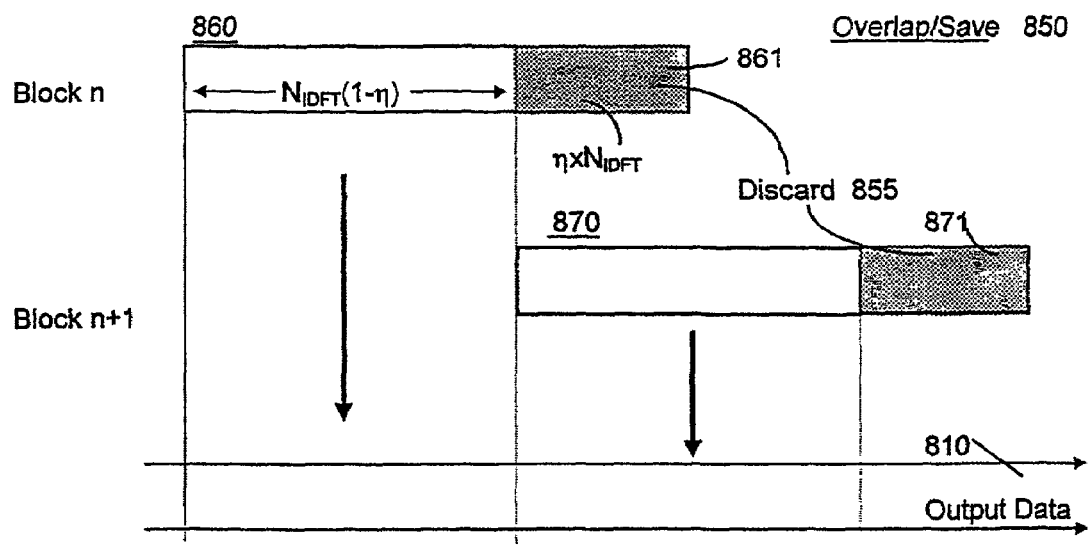

In FIG. 8 is shown a diagram of the output data stream 810 as processed by the η % overlap block combiner, 580 FIG. 5, 680 FIG. 6. For either overlap and add 820 or overlap and save 850, the blocks 830, 840, 860, 870, are overlapped with the previous block by a length equal to $N_{IDFT}*\eta$. For overlap and add 820, the overlapping part 841 of the block 840 is added 825 to the previous block's 830 corresponding overlapping part 831, while for overlap and save 850 the overlapping part 861, 871, of the block 860, 870, respectively, is simply discarded 855. For both overlap and add 820 and overlap and save 850 there are no operations performed on the non-overlapped parts of the block 860, 870.

The choice of the parameters, η % overlap, length of FFT ($N_{FFT}$) and the number of frequency coefficients ($N_{DFT}$), in the modified fast convolution algorithm is flexible by nature. In order to optimise these parameters, one must carefully make a trade-off of the radio communication system requirements against practical implementation issues such as power consumption.

Figure 9:
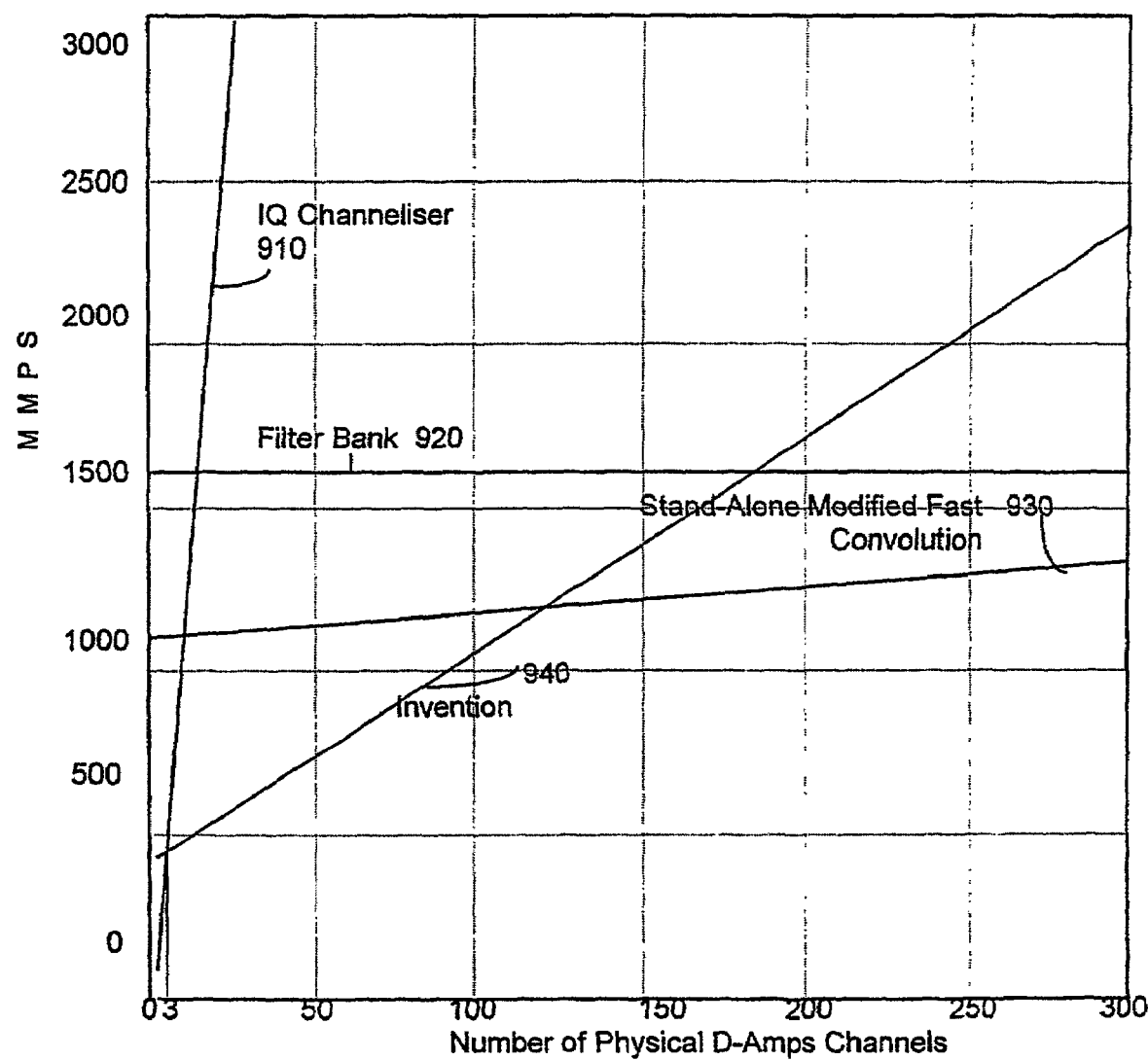
FIG. 9 is a diagram of the computational cost versus the number of channels for the DAMPS radio communication system.

FIG. 9 shows the results of a comparison between the present invention and prior methods. It can be shown that when applying the invention as a channeliser in radio communication systems that the invention has a lower computational cost and higher flexibility than the state of art techniques (e.g. IQ frequency conversion, filter banks, OLA/OLS stand-alone fast convolution schemes) described earlier. The present comparison assumes parameters relevant for implementation of a DAMPS cellular system, although the invention is not limited to such a system. The number of parameters involved in each channeliser algorithm makes it very difficult to do an exact comparison. Instead a fair comparison between the techniques has been completed with a view to get an understanding of the computational complexity, in terms of the number of multiplies per second (MPS). Note that although the input sampling rates differ in the below design examples, all values of computational complexity have been recalculated to an ADC sampling rate of 60 Million Samples Per Second (MSPS).

The IQ channeliser 910 is assumed to have an input sampling frequency of 60 MSPS and an output sampling frequency of 194.4 kSPS, the bit rate oversampled 8 times. The architecture is assumed to consist of an NCO, CIC filter and then a sequence of half band and channel filters. It has an estimated cost of around 150 Million Multiplies Per Second (MMPS) per channel, and is drawn as a line with a constant gradient in FIG. 9. Note that the NCO accounts for approximately sixty percent of the computational cost.

The filter bank algorithm 920 is assumed to have an input sampling frequency of 61.44 MSPS and an output sampling frequency of 60 kHz, i.e. the values must both be related to the channel separation of 30 kHz. Note that resampling to a multiple of the bit rate has not been included in the calculation, but will be necessary. The length of the polyphase filters and the FFT in the filter bank are 8 taps and 2048 points respectively. The computational cost of the filters is equal to 16 multiplies per sample, while the FFT (assuming five radix 4 stages and one radix 2 stage) costs 10.5 multiplies per sample. The result is a fixed computational cost of 1590 MMPS, shown in FIG. 9 as a horizontal line. Note that in reality the line will have a small positive gradient.

The stand-alone modified fast convolution algorithm 930 is assumed to have an input sampling frequency of 49.766 MSPS and an output sampling frequency of 48.6 kSPS. The algorithm is assumed to employ 50% overlap, a 65536 point FFT and a 64 point frequency filter. The large sized FFT is required to perform the necessary filtering. The architecture also requires an NCO to align the channel onto the DAMPS systems frequency grid, i.e. channel separation of 30 kHz. The estimated computational cost consists of a 1045 MMPS fixed cost plus a cost of 0.81 MMPS per channel. It is also interesting to note that due to the large FFT, around 2.2 ms of delay will exist in such an algorithm.

Prior art has indicated that the stand-alone modified fast convolution algorithm has been used in satellite systems where this delay is considered acceptable compared to the transmission delays in such systems. This amount of delay makes it incompatible with the requirements of some radio communication systems. Additionally the memory requirement for the FFT is 65535 complex words, at 20 bits precision this equals 2.6 Mbits in RAM. The number of twiddle factors (phase shifts) is at least 65536*0.75 complex words, at 20 bits precision this equals 2 Mbits in ROM. These unwieldy on-chip memories require a very large area, and reading and writing to these memories consumes a large amount of power. Using off-chip memories would require large I/O buses, and consume even more power.

The invention 940 is assumed to have an input sampling frequency of 49.7664 MSPS and an output sampling frequency of 48.6 kSPS. The modified fast convolution part of the algorithm is assumed to employ 25% overlap, a 4096 point FFT and a 32 point frequency filter. Although the prior art frequently describes the filter as truncated, as implemented here the range of points is merely limited, rather than actually truncating the response. Following the modified fast convolution part is an NCO and a time domain filtering chain consisting of 3 halfband filters and a matched channel (RRC) filter. The estimated computational cost consists of a 450 MMPS fixed cost plus a cost of 6.2 MMPS per channel. The invention has overcome the problem of a large FFT, the delay is now around 0.2 ms and the memory requirements of the FFT are very modest and easily implemented.

FIG. 9 compares the computational cost of the four channelisation algorithms. For one or two channels the IQ channeliser 910 would be the best choice. For this example the stand-alone modified fast convolution algorithm 930 is not at all applicable because of the delay and size of the FFT, therefore the present invention 940 has the lowest computational cost up until around 180 channels. However, in a different radio system with lower requirements on the filtering, e.g. satellite systems, then the stand-alone modified fast convolution 930 algorithm is more practical, and in this situation the invention 940 has the lowest computational cost up until around 100 channels.

In terms of computational cost the invention 940 has the lowest computational cost from a few channels to just over 100 channels. This matches the requirements for radio communication systems in terms of the number of channels normally used and therefore, in terms of computational cost, it can be seen to be the best channelising solution. It can also be seen that in typical cellular systems, with around 20 channels, the present invention 940 provides by far the lowest costs of these methods.

Figure 10:
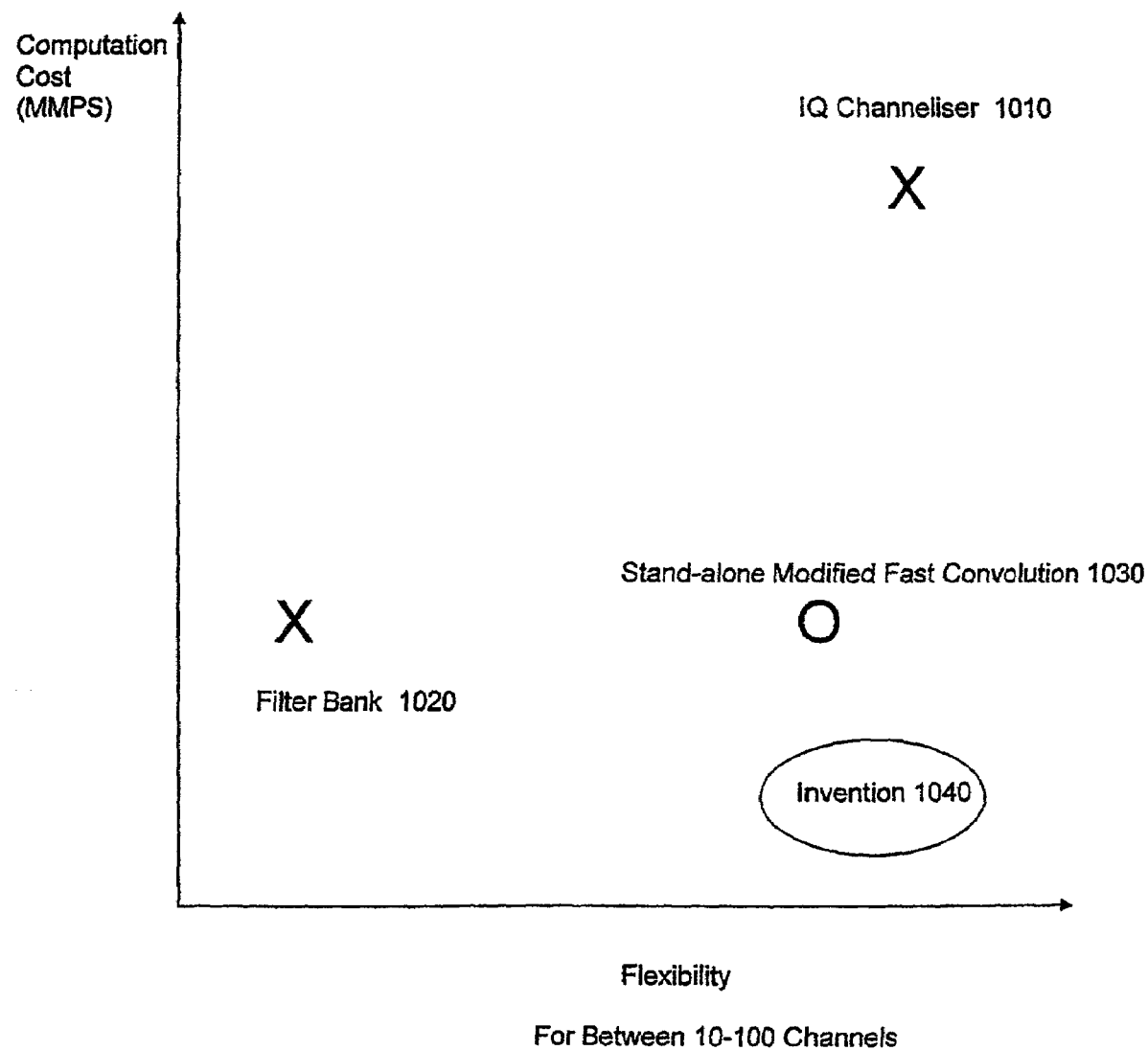
FIG. 10 is a diagram of the computational cost versus the flexibility for the DAMPS radio communication system.

FIG. 10 illustrates computational cost in MMPS versus flexibility of the different channeliser algorithms for a typical number of channels in a cellular system, between 10–100. The IQ channeliser 1010 is very flexible in terms of selecting the sampling frequency when the channel bandwidth is different to the channel bit rate. Multiple standards are possible since the channels are computed independently but this all comes with a high computational cost.

The filter bank algorithm 1020 has a lower computational cost, but at the expense of flexibility. That is, the sampling frequency must be multiple of the channel bandwidth, and therefore some form of resampling must be employed to achieve the final channel bit rate. The architecture also cannot cope with two channel bandwidths that are not integer multiplies of the other, and therefore filter banks are not compatible with multiple standard systems. More than one different channel bandwidth at the same time means that you have to duplicate the hardware up to and maybe including the ADC, a very costly exercise. Having more than one different channel bandwidth at different times means that you have to have reprogrammable polyphase filters and FFTs, i.e. additional complexity.

The stand-alone modified fast convolution algorithm 1030 is more flexible than the filter bank algorithm 1020, and has a lower computational cost than the IQ channeliser 1010, although it must be remembered that it is actually impractical in terms of delay and memory in this example. The FFT must be designed to be long enough (in terms of fine frequency resolution) to cope with the narrowest channel bandwidth, consequently the IDFT gets longer simply to have enough output bandwidth. This means that the fixed and channel dependant cost for wider bandwidth channels is higher than for narrow bandwidth channels.

In terms of flexibility the invention 1040 includes all of the advantages of the modified fast convolution algorithm 1030 such as the ability to cope with different channel bandwidths simultaneously and a flexible relationship between channel bandwidth and channel bit rate. In addition, it also removes the constraint on the FFT length, in that it can now be chosen independently of the channel bandwidth. In multistandard systems the FFT length can now be designed as a compromise between the multiple channel bandwidths and the different radio system requirements. The cost for multiple standards will remain low. FIG. 10 shows that the invention is not only very flexible compared to all other techniques but it also has the lowest computational cost for more than a few channels up until 100 channels.

Although only one radio communication system, DAMPS, has been used here as an example, the same conclusions can be shown to apply to other radio communication systems. In addition, the invention is also applicable, but not limited to, other radio systems such as e.g. Land Mobile Radio (LMR), satellite systems, and wireless local area networks (WLANs). It is also applicable in more general filtering problems where several channels or frequency ranges should be separated or combined, e.g. subband techniques, coding, compression, etc. When applied to these different systems and general filtering problems the present invention provides lower costs, smaller FFTs and reduced delays.

The embodiments described above serve merely as illustration and not as limitation. It will be apparent to one of ordinary skill in the art that departures may be made from the embodiments described above without departing form the spirit and scope of the invention. The invention should not be regarded as being limited to the examples described, but should be regarded instead as being equal in scope to the following claims.

What is claimed is:

1. A method for extracting a channel from a data stream using a modified fast convolution algorithm, said modified fast convolution algorithm consisting of a common-channel part followed by a channel-specific part, said channel-specific part comprising the steps of:
    selecting a range of n Discrete Fourier Transform bins around the center frequency of the channel;
    multiplying said bins with a frequency response;
    performing an $N_{IDFT}$-point Inverse Discrete Fourier Transform on these n data points; and,
    performing a signal processing step;
    wherein said common-channel part of said modified fast convolution algorithm comprises the step of performing a $N_{FFT}$-Point Fast Fourier Transform on overlapping blocks of said data stream; and,
    wherein said $N_{FFT}$-point Fast Fourier Transform in said common-channel part of said modified fast convolution algorithm is preceded by the steps of:
        first, processing said data stream by a η % overlap block generator;
        second, multiplexing said data stream to form a complex signal;
        wherein said channel-specific part of said modified fast convolution algorithm further comprises the steps of:
            a first step of performing extraction of said bins;
            a second step of performing said multiplication of said bins with said frequency response;
            a third step of performing an $N_{IDFT}$-point Inverse Discrete Fourier Transform on these n data points; and,
            a fourth step of processing said digital data stream by a η % overlap block combiner.

2. The method of claim 1, wherein said frequency response has a limited range.

3. The method of claim 1, wherein said η % overlap block generator
generates said blocks using an overlap/add process which chops said data stream into non-overlapping sections of length $N_{FFT}*(1-\eta)$ and padded with $N_{FFT}*\eta$ zeros to form a single block.

4. The method of claim 1, wherein said η % overlap block generator
generates said blocks using an overlap/save process which chops said data stream into a series of blocks of length $N_{FFT}$, each of which has an overlap with the previous block in the series given by a length of $N_{FFT}*\eta$.

5. The method of claim 1, wherein said η % overlap block combiner
processes said data stream using an overlap/add process wherein said blocks are overlapped with the previous block by a length equal to $N_{IDFT}*\eta$, the overlapping part of a block is added to the previous block's corresponding overlapping part to produce the output data stream.

6. The method of claim 1, wherein η % overlap block combiner
processes said data stream using an overlap/save process wherein said blocks are overlapped with the previous block by a length equal to $N_{IDFT}*\eta$, the overlapping parts of the blocks are discarded and said output data stream is formed from the non-overlapping parts of the blocks.

7. The method of claim 1, wherein said multiplexing step further comprises the step of
producing a complex signal $z(t)=x(t)+j*y(t)$, where $x(t)$ and $y(t)$ are two consecutive blocks.

8. The method of claim 7, wherein $y(t)$ is also rotated.

9. The method of claim 1, wherein said $N_{FFT}$-point Fast Fourier Transform is a pipeline architecture with a power of 2.

10. A method for inserting a channel into a data stream, said method consisting of a modified fast convolution algorithm, said modified fast convolution algorithm consisting of a channel-specific part followed by a common-channel part common to all channels, said channel-specific part comprises the steps of:
performing a signal processing step;
performing a $N_{DFT}$-point Discrete Fourier Transform on said stream;
multiplying said stream with a frequency response; and,
inserting a range of n Fast Fourier Transform bins around the center frequency of the channel;
wherein said common-channel part of said modified fast convolution algorithm comprises the step of performing a $N_{IFFT}$-point Inverse Fast Fourier Fast Transform on overlapping blocks of said data stream; and,
wherein said channel-specific part of said modified fast convolution algorithm comprises the steps of:
a first step of processing said digital data stream by a η % overlap block generating;
a second step of performing a Discrete Fourier Transform;
a third step of multiplying the result of said Discrete Fourier Transform with the filter frequency coefficients; and,
a fourth step of inserting said bins around the center frequency of the channel;
said common-channel part of said modified fast convolution algorithm further comprises the steps of;
de-multiplexing the output from said $N_{IFFT}$-point Inverse Fast Fourier Transform to form a real signal; and,
processing said digital data stream by a η % overlap block combiner.

11. The method of claims 10, wherein said frequency response has a limited range.

12. The method of claim 10, wherein said η % overlap block generator
generates said blocks using an overlap/add process which chops said data stream into non-overlapping sections of length $N_{FFT}*(1-\eta)$ and padded with $N_{FFT}*\eta$ zeros to form a single block.

13. The method of claim 10, wherein said η % overlap block generator
generates said blocks using an overlap/save process which chops said data stream into a series of blocks of length $N_{FFT}$, each of which has an overlap with the previous block in the series given by a length of $N_{FFT}*\eta$.

14. The method of claim 10, wherein said η % overlap block combiner
processes said data stream using an overlap/add process wherein said blocks are overlapped with the previous block by a length equal to $N_{IDFT}*\eta$, the overlapping part of a block being added to the previous block's corresponding overlapping part to produce the output data stream.

15. The method of claim 10, wherein η % overlap block combiner
processes said data stream using an overlap/save process wherein said blocks are overlapped with the previous block by a length equal to $N_{IDFT}*\eta$, the overlapping parts of the blocks are discarded and said output data stream is formed from the non-overlapping parts of the blocks.

16. The method of claim 10, wherein
said bins are inserted into said Inverse Fast Fourier Transform in a symmetrical way where $Z(k_{start}+k)=X(k)$ and $Z(N_{IFFT}-k_{start}-k)=X'(k)$, $K_{start}$ being where the first bin of the channel is to be inserted and K is an integer from $0 \to N-1$, said bins for a given channel given by $X(0) \to X(N-1)$ where $X'(k)$ is the complex conjugate of $X(k)$ and being inserted into said Inverse Fast Fourier Transform in the order $X(0) \to X(N-1)$.

17. The method of claim 10, wherein
said bins are inserted into said Inverse Fast Fourier Transform by $Z(k_{start}+k)=X(k)+jY(k)$ and $Z(N_{IFFT}-k_{start}-k)=X'(k)+jY'(k)$, $K_{start}$ being where the first bin of the channel is to be inserted and K is an integer from $0 \to N-1$, said bins for a given channel given by $X(0) \to X(N-1)$ where $X'(k)$ is the complex conjugate of $X(k)$ and being inserted into said Inverse Fast Fourier Transform in the order $X(0) \to X(N-1)$.

* * * * *

UNITED STATES PATENT AND TRADEMARK OFFICE
CERTIFICATE OF CORRECTION

| | | |
|---|---|---|
| PATENT NO. | : 7,227,902 B2 | Page 1 of 1 |
| APPLICATION NO. | : 09/731775 | |
| DATED | : June 5, 2007 | |
| INVENTOR(S) | : Richard Hellberg | |

It is certified that error appears in the above-identified patent and that said Letters Patent is hereby corrected as shown below:

In Column 6, Line 42, delete "NCOS" and insert -- NCOs --, therefor.

In Column 13, Line 33, in Claim 8, after "y(t) is" delete "also".

In Column 13, Line 44, in Claim 10, delete "a" and insert -- an --, therefor.

In Column 13, Line 56, in Claim 10, delete "generating" and insert -- generator --, therefor.

Signed and Sealed this

Ninth Day of September, 2008

JON W. DUDAS
*Director of the United States Patent and Trademark Office*